Figure 1:
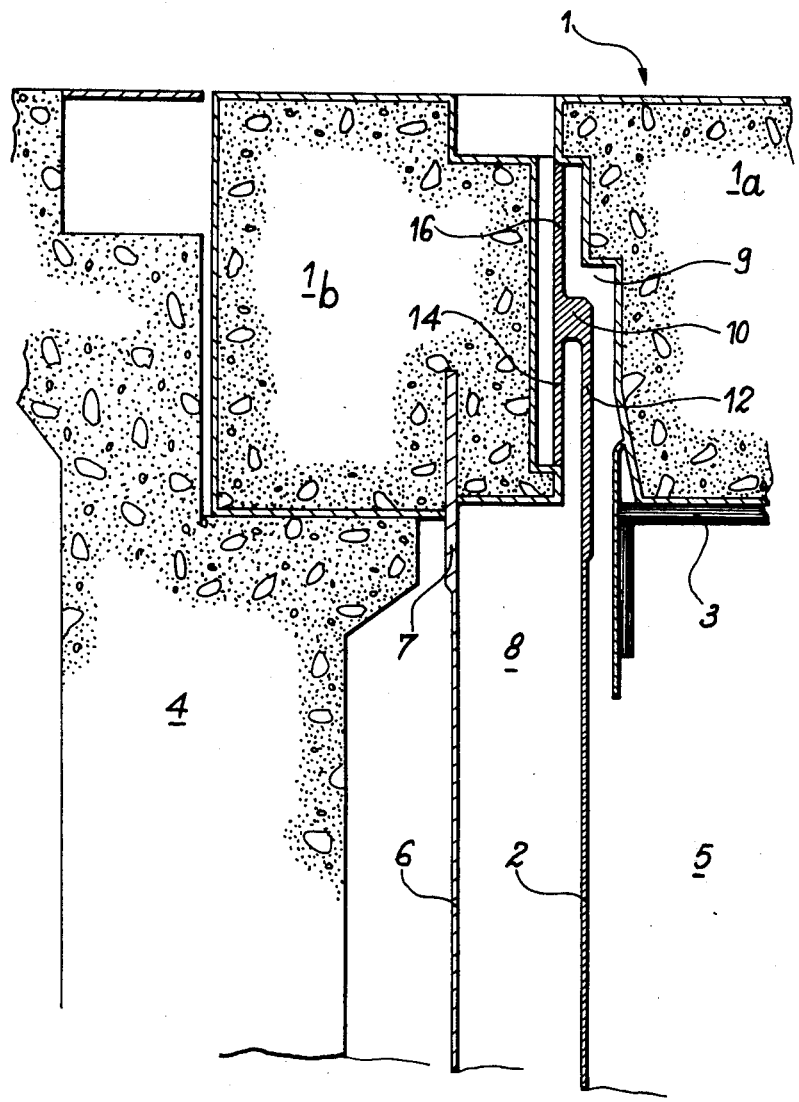

United States Patent [19]

Mahé et al.

[11] 3,995,918
[45] Dec. 7, 1976

[54] SYSTEM FOR BEARING A NUCLEAR REACTOR VESSEL COOLED BY LIQUID METAL

[75] Inventors: Armel Mahé, Palaiseau; Georges Jullien, St-Michel-sur-Orge, both of France

[73] Assignee: Commissariat a l'Energie Atomique, Paris, France

[22] Filed: Aug. 29, 1975

[21] Appl. No.: 609,167

[30] Foreign Application Priority Data

Aug. 29, 1974 France .................... 74.29544

[52] U.S. Cl. .................... 308/77; 308/161
[51] Int. Cl.² .......................... F16C 1/24
[58] Field of Search .............. 308/77, 161, 162

[56] References Cited

UNITED STATES PATENTS

| 3,822,962 | 7/1974 | Wieser ........................ 308/77 |
| 3,905,657 | 9/1975 | Ishida et al. ................. 308/77 |

*Primary Examiner*—M. H. Wood, Jr.
*Assistant Examiner*—Richard A. Bertsch
*Attorney, Agent, or Firm*—Cameron, Kerkam, Sutton, Stowell & Stowell

[57] ABSTRACT

This invention relates to a bearing system for supporting a nuclear reactor vessel of the kind which is suspended from the reactor closure slab.

The bearing system comprises a ring connected at one end to a collar and at the other end to two collars. The collar connected to the bottom end of the ring forms the top part of the vessel to be supported while the other two collars fit into the slab at two separate places. The ring and collars are disposed in an annular space formed in the slab and dividing it into two parts, i.e. a central part and a peripheral part surrounding the central part of the slab.

7 Claims, 4 Drawing Figures

SYSTEM FOR BEARING A NUCLEAR REACTOR VESSEL COOLED BY LIQUID METAL

The invention relates to a bearing system for nuclear reactor vessels cooled, for example, by liquid metal. By way of illustration, the present description refers particularly, to fast-neutron line reactors cooled by liquid metal, but of course the invention is applicable in general to any nuclear reactor in which the cooling fluid is confined in a vessel, for example, molten salt reactors.

In fast-neutron reactors, the mass of liquid cooling metal is contained in a metal vessel (the main vessel) surrounded by a second vessel (the safety vessel) adapted to recover any leaks of liquid metal from the main vessel. The two vessels, which have the same vertical axis, are suspended from the slab closing the reactor, a neutral gas filling the space between the two vessels.

In known constructions, the vessels are suspended, simply by welding, from the reactor closure slab, the top collars of the vessels fitting into the slab. This method of suspension is completely sealing-tight against surrounding atmospheres but has the disadvantage of subjecting the tank suspension system to considerable thermal stresses. More precisely, at the place where the main vessel is connected to the slab, the temperature of the vessel is substantially the same as that of the slab, i.e. is low, since the slab is kept at near ambient temperature by internal cooling circuits, whereas the wall of the main vessel is in contact on one side with the liquid metal surmounted by a hot gas (usually argon) and on the other side with a gas (usually nitrogen) which is also at an elevated temperature.

Consequently, when the reactor is in permanent operation, there is a very steep temperature gradient between these two levels, which are very close to one another. The gradient may change during transient operating conditions, thus subjecting the vessel suspension to considerable mechanical stresses.

To avoid these stresses, attempts have been made to obtain a temperature distribution which is as favourable as possible to the mechanical behaviour of the top part of the vessel suspension, and to protect the suspension region from heat coming from the thermosiphons or flows of gas supplied from the hot argon atmosphere above the liquid metal or from the neutral gas atmosphere (usually nitrogen) between the main vessel and the safety vessel.

The invention relates to a vessel-bearing system whereby the regions where the tank collars fit into the reactor closure slab are protected from excessive thermal gradients.

To this end, the bearing system is characterised in that it comprises a ring connected at one end to a collar and at the other end to two collars, the collar connected to the bottom end of the ring forming the top part of the vessel to be supported, the other two collars fitting into the slab at two separate places, and the ring and collar assembly being disposed in an annular space formed in the slab and dividing it into two parts, i.e. a central part and a peripheral part surrounding the central part.

In one preferred embodiment, the bottom of the ring is connected to two collars, one forming the top part of the vessel to be supported and the other fitting at its bottom end into the peripheral part of the closure slab, the top part of the ring being connected to a collar fitting into the central part of the slab.

In another preferred embodiment, the bottom of the ring is connected to a collar forming the top part of the vessel to be supported, and the top part of the ring is connected to two collars fitting respectively into the peripheral part and the central part of the slab. A cooling circuit is provided in the space between the two top collars. In the same embodiment, the closure slab is prolonged by a projection above the peripheral part of the slab, thus providing biological protection.

In the aforementioned embodiments, the ring is of solid metal. In another embodiment, the solid ring can be replaced by an annular caisson having a rectangular cross-section and formed with perforations in the part facing the exterior. The top part of the vessel fits into the caisson, the place where it fits in being reinforced by vertical partitions all the way up it, welded to the collar and to the caisson.

Figure 2:
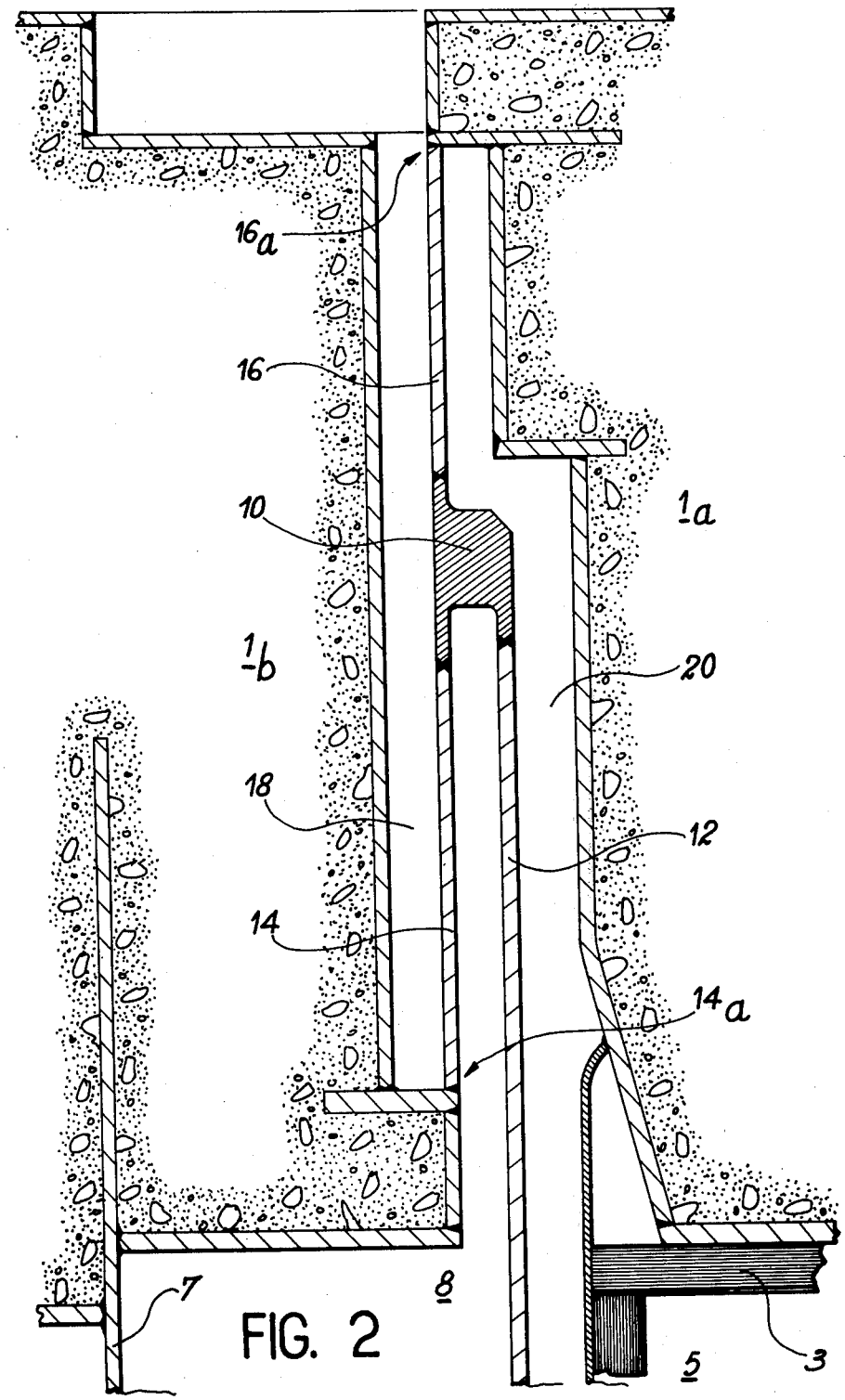
Figure 3:
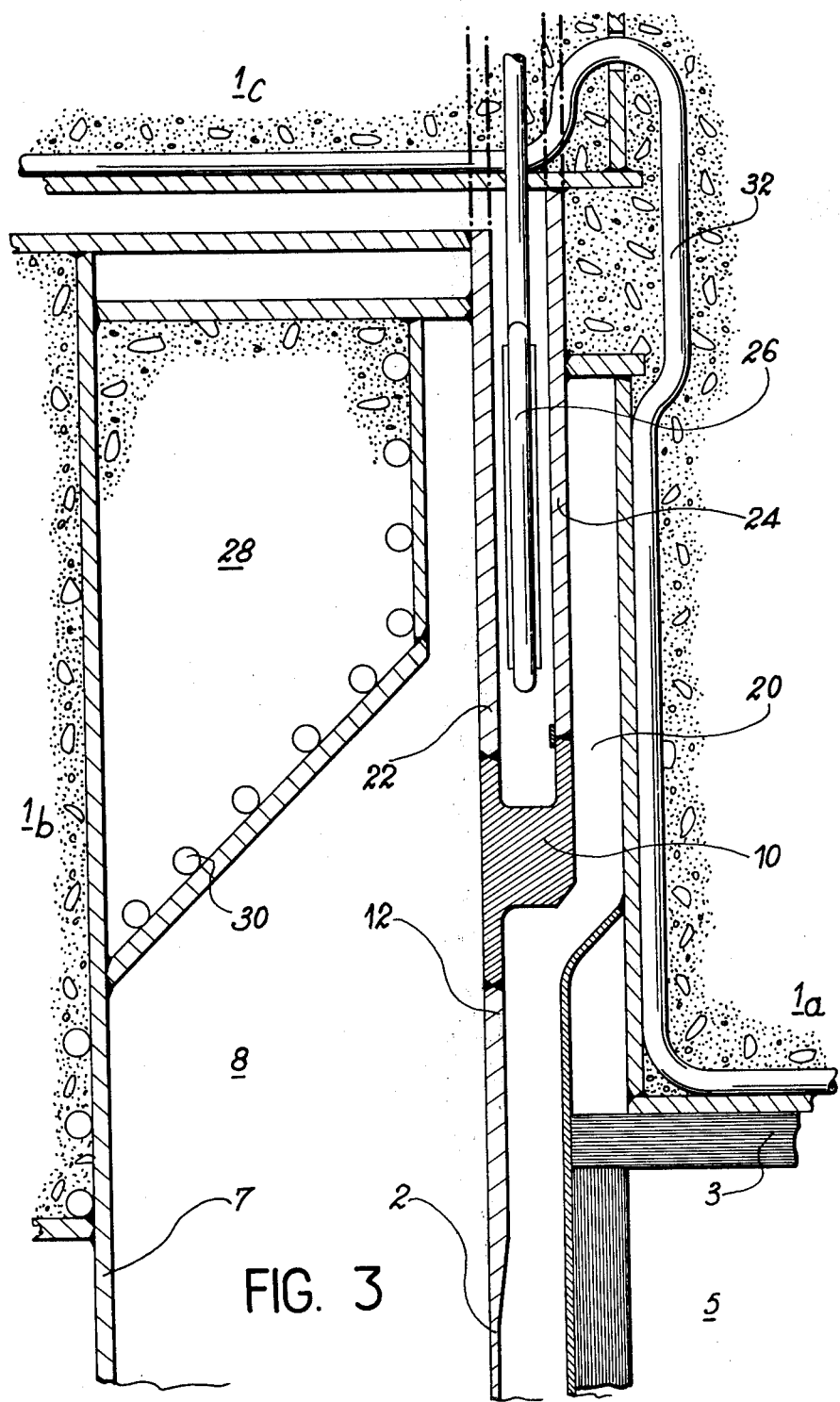
Figure 4:
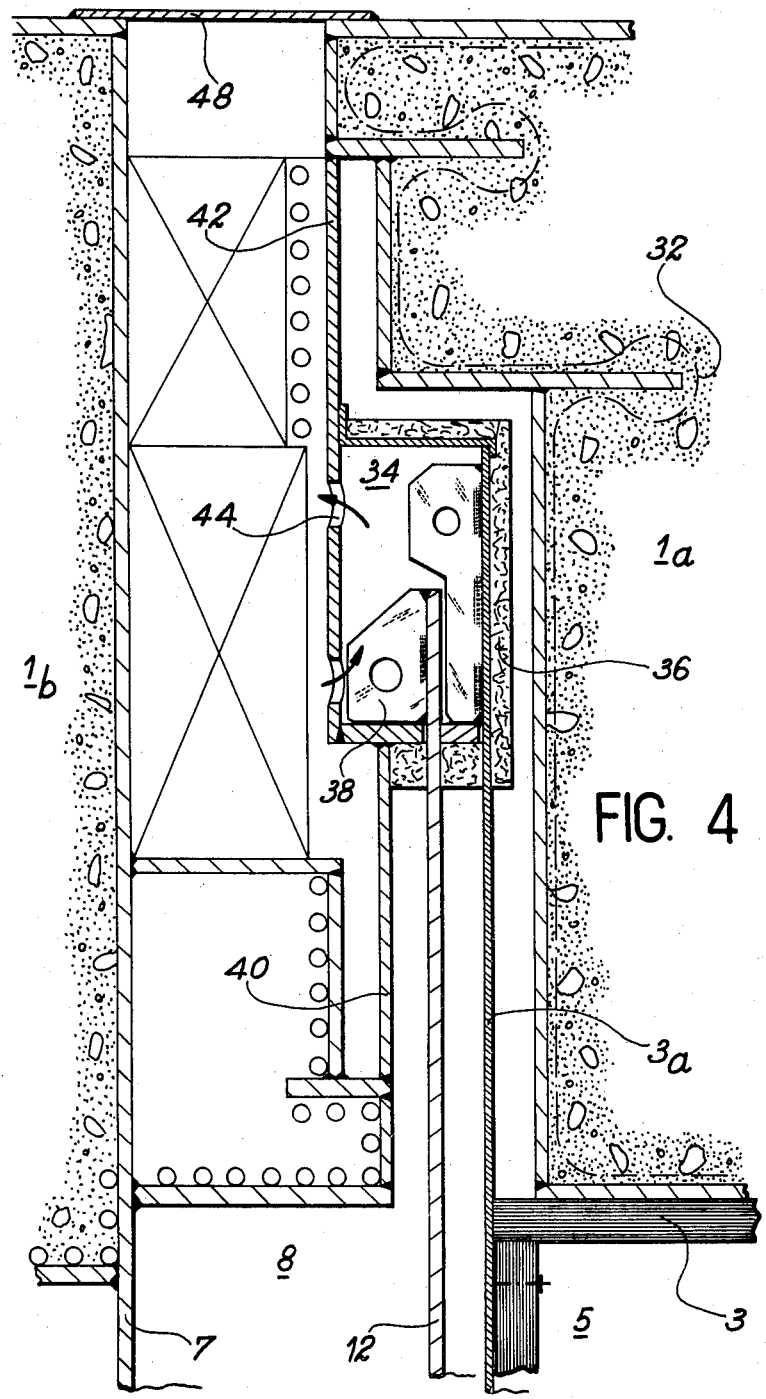

The invention will now be described by way of example with reference to the accompanying drawings, in which:

FIG. 1 is a partial view in axial section of the slab closing a reactor cooled by liquid metal, the slab bearing the main vessel and the safety vessel contained in the reactor enclosure, and FIGS. 2, 3 and 4 show variants of the system according to the invention for securing the main vessel to the closure slab.

FIG. 1 shows the top left part of a view in vertical section along the reactor axis, of an assembly bearing a main vessel 2 and a safety vessel 6 of a nuclear reactor cooled by liquid metal. Metals 2 and 6 are suspended, with respect to a concrete enclosure 4, from the closure slab 1 of the reactor. Vessel 6 surrounds vessel 2, leaving a space 8 occupied by a neutral gas atmosphere, generally nitrogen. Slab 1 is made up of two parts, a central part 1a having an average diameter less than that of the main vessel 2, and a peripheral part 1b surrounding the central part 1a. The bottom surface of part 1a is lined with a heat-insulating material 3 in contact with a gas atmosphere 5, usually argon. The safety vessel 6 is suspended by its top collar 7 which fits into the peripheral part 1b of slab 1, the main vessel 2 being suspended from slab 1 by a bearing system according to the invention, disposed in the space 9 between parts 1a and 1b of slab 1. The bearing system according to the invention comprises a metal ring 10 secured at its bottom to the top collar 12 of vessel 2 and to a collar 14 fitting into the peripheral part 1b of slab 1. The top part of ring 10 is secured by a collar 16 fitting into the central part 1a.

FIG. 2 is a larger-scale view of the embodiment of the bearing system according to the invention, as described in FIG. 1. In FIG. 2, ring 10 is welded at its bottom end at 14a to collar 14 fitting into part 1b, and is also welded to the top collar 12 of the main vessel 2, whereas the top end of ring 10 is welded to collar 16 which fits at 16a into the central part 1a of slab 1.

In the drawing, the central part 1a of slab 1 rests on collar 16 connected to the intermediate ring 10, from which the main vessel is suspended. The assembly comprising central part 1a and vessel 2 rests, with interposition of collar 14, on the peripheral part 1b of slab 1 at 14a. The place 14a is subjected only to heat from the thermosiphon supplied with nitrogen 8, and is cooled by the air flowing in space 18. The place 16a where collar 16 fits into the central part 1a is likewise subjected only to heat supplied by a single thermosiphon (argon) and is also cooled by the air flowing in space 18. Thus, the thermal gradients are considerably reduced at the two places 14a and 16b. Ring 10, which comprises a low-inertia flange, is at a temperature between that of slab 1 and that of vessel 2. Since this temperature varies with the level of ring 10, the level can be adjusted to produce acceptable stresses at the places where ring 10 is connected to collars 12, 14 and 16.

FIG. 3 illustrates a variant of the supporting system for the main vessel 2 suspended from slab 1. Slab 1 has a central circular part 1a having a slightly smaller diameter than the main vessel 2 (not shown), its bottom surface being lined with a heat-insulating material 3 in contact with an argon atmosphere 5 above the level of sodium (not shown). The central slab 1a is prolonged at its top by a projection 1c of similar structure, disposed above the second or peripheral annular part 1b. Part 1b comprises a ring having a cross-section, as shown in the drawing, comprising a square part attached at the interior to a trapezoidal part 28. The upper collar 7 of the safety vessel (not shown) fits in at the junction between the square part and part 28. Cooling circuits (30) or (32) travel through the entire slab 1.

In FIG. 3, the main vessel 2 is connected to a ring 10 connected to two collars 22, 24. Collar 24 fits into the central part of slab 1a and bears it, whereas collar 22, which fits into the peripheral part 1b of slab 1, bears the assembly comprising the vessel and the central part 1a. A cooling circuit 26 is disposed between collars 22 and 24. In this embodiment, the places where the two collars are fitted in are subjected to only one hot atmosphere, i.e. an argon atmosphere for collar 24 and a nitrogen atmosphere for collar 22. In addition, the two places are cooled by a cooling circuit 26.

Of course, the system for bearing the main vessel could be similarly designed without prolonging the central part 1a of slab 1 by projection 1c, since projection 1c simply provides biological protection.

FIG. 4 illustrates another variant of the vessel bearing system. In FIG. 4, slab 1 likewise has two parts, a central circular part 1a surrounded by a second peripheral part 1b, the collar 7 of the safety vessel fitting all the way up part 1b. The main vessel 2, (not shown) has an upper collar 12 which fits in an annular caisson 34. The place where it fits in, which extends half way up the caisson, is reinforced by partitions 38 welded to the fitted-in part of collar 12 and to the side walls of caisson 34. A collar 40 fitted into the peripheral part 1b of slab 1 is welded to the bottom of caisson 34. One of the side walls of the caisson comprises a collar 42 fitting at its top into slab 1a and having apertures such as 44 at the level of the caisson, the other wide walls being protected by heat insulation 36. A collar 3a bearing the heat insulating material 3 of the central part 1a is welded to one of the side walls inside the caisson. The entire device is in the space between parts 1a and 1b of slab 1, which is sealed at the top by a plate 48.

In this embodiment, the places where collars 40, 42 respectively fit into parts 1b and 1a are subjected only to one hot thermosiphon, i.e. argon or nitrogen. Furthermore, the annular caisson and the place where the top collar 12 of the main vessel 2 fits in the caisson are cooled by a flow of air through apertures such as 44, the flow being adjustable in dependence on the level of the caisson, so as to maintain an acceptable temperature therein.

The thus-mentioned embodiment is apparently more complex but is relatively easy to put into practice and has great flexibility with regard to deformations due to thermal or mechanical stress.

We claim:

1. A bearing system for supporting a nuclear reactor vessel cooled, for example, by liquid metal, the vessel being of the kind which is suspended from the reactor closure slab, the system being characterised in that it comprises a ring connected at one end to a collar and at the other end to two collars, the collar connected to the bottom end of the ring forming the top part of the vessel to be supported, the other two collars fitting into the slab at two separate places, and the ring and collar assembly being disposed in an annular space formed in the slab and dividing it into two parts, i.e. a central part and a peripheral part surrounding the central part.

2. A bearing system according to claim 1, characterised in that the bottom of the ring is connected to two collars, one forming the top part of the vessel to be supported and the other fitting at its bottom end into the peripheral part of the closure slab, the top part of the ring being connected to a collar fitting into the central part of the slab.

3. A bearing system according to claim 1, characterised in that the bottom of the ring is connected to a collar forming the top part of the vessel to be supported, and the top part of the ring is connected to two collars fitting respectively into the peripheral part and the central part of the slab.

4. A bearing system according to claim 3, characterised in that it comprises a cooling circuit in the space between the two top collars.

5. A bearing system according to claim 1, characterised in that the ring is a solid metal ring.

6. A bearing system according to claim 1, characterised in that the ring is an annular caisson having a rectangular cross-section, the part facing the exterior being provided with perforations and the inner part comprising vertical metal plates disposed all the way up the place where the collar fits into the vessel, and welded to the collar and the caisson.

7. A bearing system according to claim 1, characterised in that the central part of the slab is prolonged by a similarly-constructed extension above the peripheral part of the slab.

\* \* \* \* \*